2,950,744
WHEEL RIM HOLDING WEB

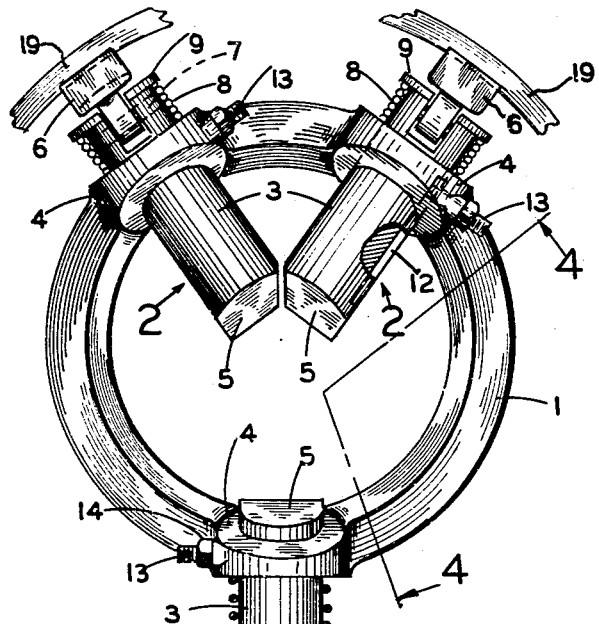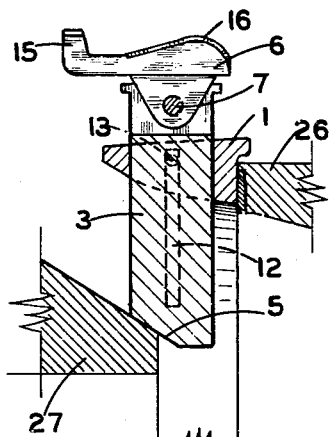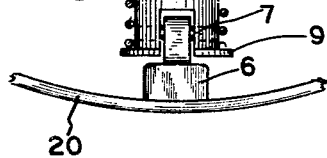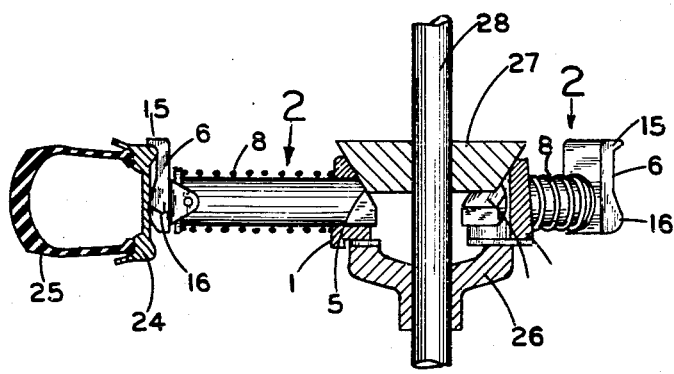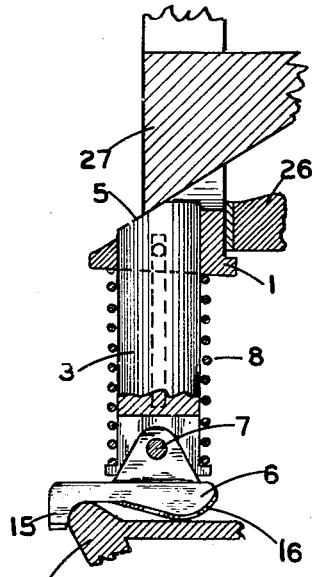

Harry G. Twiford, 777 S. Adams St., Denver, Colo.

Filed Jan. 27, 1958, Ser. No. 711,484

3 Claims. (Cl. 144—288)

This invention relates to an adjustable web for temporarily holding a pneumatic wheel rim during mounting and dismounting operations, when such a rim is not mounted on a wheel.

Truck tires, and other large size pneumatic vehicle wheels, are commonly made in several sections. A common breakdown is to provide a web or wheel which is mountable on a vehicle axle and a separable rim which is mountable over the web. The wheel rim is the member which is arranged to support a vehicle pneumatic tire. Such wheels have several advantages, and one important advantage is the ability to remove the tire and tire rim without removing the main body of the wheel from its mounting on the vehicle. However, when such a wheel rim is removed from the wheel, it has a large center opening and it is not usable on currently available tire removing machines which have a wheel holding table.

Included among the objects and advantages of the present invention is to provide a temporary web for a vehicle wheel rim. The web is arranged to fit a plurality of different sizes of vehicle rims, and it provides means for securely holding such rims on tire mounting machines for tire repairs. The device includes a positive grip arrangement for securely holding the wheel rim in a predetermined position in the web, and further the device provides means for centering the web so as to assure correct centering of the wheel rim on a tire changing machine.

These and other objects and advantages of the invention may be readily ascertained by referring to the following description and appended illustrations in which:

Fig. 1 is a top plan view of an expansible temporary web for a vehicle wheel rim according to the invention;

Fig. 2 is a side elevational detail of a supporting arm in retracted position;

Fig. 3 is a side elevational detail view of a supporting arm in extended position; and, Fig. 4 is a side elevational view in partial cross section taken along section lines 4—4, Fig. 1.

In an effective embodiment of the invention shown in Fig. 1, an annular body 1 has mounted thereon three plungers 2 set at 120° to provide the uniform bearing against a wheel rim. Each plunger 2 includes a reciprocable body 3 mounted in a collar 4 which is an integral part of the ring 1. Each plunger 3 includes an inner beveled face 5 on the innermost end thereof, and a pressure pad 6 pivotally mounted by a roll pin 7 at the outer end thereof. A retractile spring 8 is mounted on each plunger being secured to an outer flange 9 of the plunger 3 at one end and to the collar 4 at the opposite end. Each spring is arranged to exert an inward pressure on the plunger. The plunger 3 has a slot 12 cut in its side, and a stock pin 13 threaded through the collar 4 engages the slot and prevents removal of the plunger when the pin is in place. The pin 13 is maintained in position by a lock nut 14. The pressure pad 6 includes a rim stop 15 and an arcuate section 16 both of which are arranged to bear against a rim and maintain a two point bearing against the rim.

In one application, the device is made to accommodate seventeen to twenty-four inch truck rims. Thus the ring must be small enough to telescope in the rim and allow room for the plungers. The device as illustrated in Fig. 1 shows the upper two plungers bearing against a minimum diameter rim 19, while the lower plunger is shown in extended position bearing against a maximum diameter rim 20. This represents about the seventeen and twenty-four inch sizes usable with one size of web of the invention. Obviously, when the device is used with a rim, the three plungers will be extended uniformly so that the adapter ring 1 is substantially centered in the rim.

In a typical use, illustrated in Fig. 4, the temporary web is positioned in a tire rim 24, only partially shown for sake of clarity, but it is understood that the rim and the rubber tire 25 are annular members and extend completely around the circle with the three plungers contacting the rim. The adapter ring 1 seats on an annular support 26 and a clamp-down cone or beveled member 27 mounted on a center post 28, both of which are common in the art, is forced against the beveled surface 5 of each of the plungers. The cone 27 bears against the plungers pushing them outwardly against the rim 24 and at the same time holding the web on the support. The pressure pad 6 pivots so that it contacts the rim with the rim stop 15 and the pressure point 16 providing a two point suspension for the rim on each pressure pad. With the tire rim thus held tightly, the tire may be removed or replaced from the rim as is common practice.

The tire supporting member 26 of the tire changing machine may be either a vertical or a horizontal member or it may be a tiltable member from vertical to horizontal, for use with large heavy truck tires. In Figs. 2 and 3 the details illustrate such a support 26 in horizontal position, with a portion of the clamping cone 27 positioned against the beveled surfaces 5 of the plungers. In the illustration of Fig. 2 the plunger 3 is in retracted position, such as in position to hold a minimum size wheel rim for which the device is designed. In this case the plunger 3 is retracted so that the clamp-down cone 27 contacts only the top of the beveled surface 5. In the device illustrated in Fig. 3 the plunger is fully extended contacting the largest size rim 24 which may be utilized with the device of the invention. In each case the cone 27 holds the ring of the web securely against the support 26, and further forces the plunger tightly against the rim of the wheel holding the rim securely on the web. The cone, therefore, wedges the plungers against the rim and pulls the web against the table. When the tire repair function has been performed, the clamp-down cone and its supporting post 28 are removed, relieving the pressure of the plungers against the rim, and the temporary web is readily removed from the tire rim.

The pressure pad 6 performs a double function in that it provides an automatic centering by providing the rim stop 15 which when placed in position against a rim automatically positions the temporary web axially of the rim. This rim stop is placed in position so that the plungers are generally centered on the axis of the rim to provide a secure and relatively non-tipping hold on the rim. The pads, furthermore, provide a two point contact on the rim by providing the pressure point or surface 16 in addition to the rim stop 15. The pressure point 16 is made arcuate to fit various types of rims. This two point system provides a secure hold on the rim and prevents tipping or tilting of the rim during the operations of removing the tire therefrom.

While the invention has been illustrated by reference

I claim:

1. A temporary web for a vehicle tire rim comprising an annular body arranged to telescope in a vehicle wheel rim, at least three plunger members telescopically mounted in said member and arranged for radial reciprocable movement, stop means for limiting maximum and minimum radial movement of said plungers, beveled surface means on the inner end of each said plunger for seating against a wedging member having a coacting beveled surface arranged to force each said plunger radially outwardly, and a pressure pad pivotally mounted on the outer end of each said plunger, each said pressure pad arranged to provide a two point seating against a wheel rim.

2. A web according to claim 1 in which one of said seating points on each pad is a rim stop for centering said web axially in a wheel rim.

3. A web according to claim 1 in which said pad includes two rim seating points on opposed sides of the pad pivot whereby to provide an even distribution of pressure on the wheel rim.

References Cited in the file of this patent

UNITED STATES PATENTS

| | | |
|---|---|---|
| 45,364 | Underhill | Dec. 6, 1864 |
| 128,260 | Taylor | June 25, 1872 |
| 793,531 | Mann | June 27, 1905 |
| 1,432,967 | Clark | Oct. 24, 1922 |
| 1,451,344 | Robinett | Apr. 10, 1923 |
| 1,538,875 | Stevens | May 19, 1925 |